April 25, 1967  AL L. CRAMER  3,316,401
ROAD RACE TRACK SWITCH
Filed June 1, 1964  2 Sheets-Sheet 1
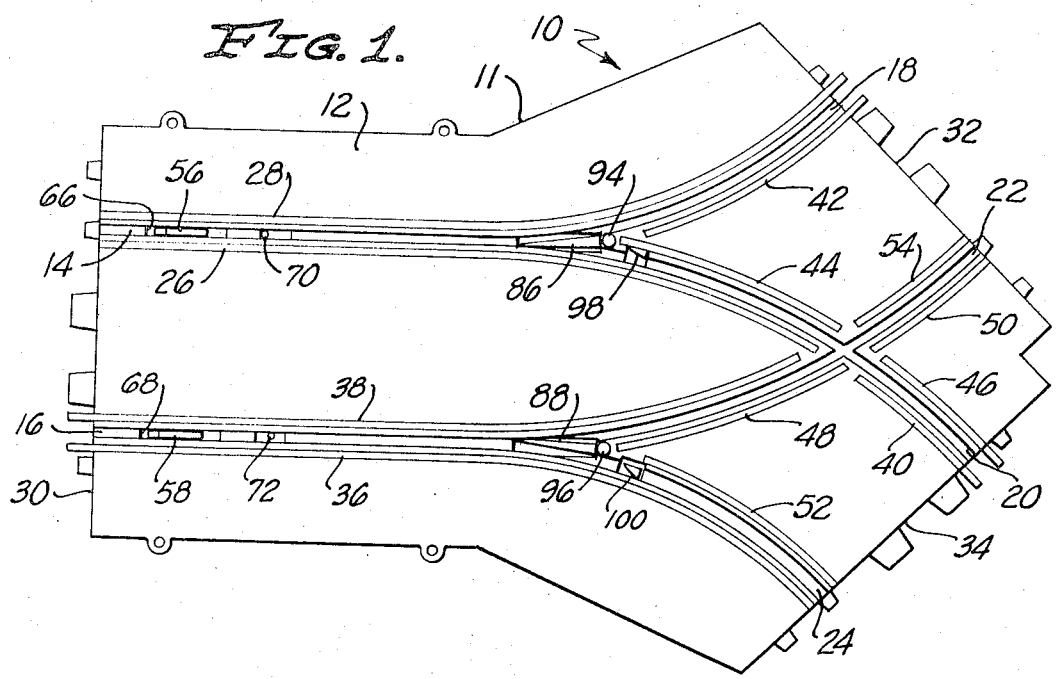
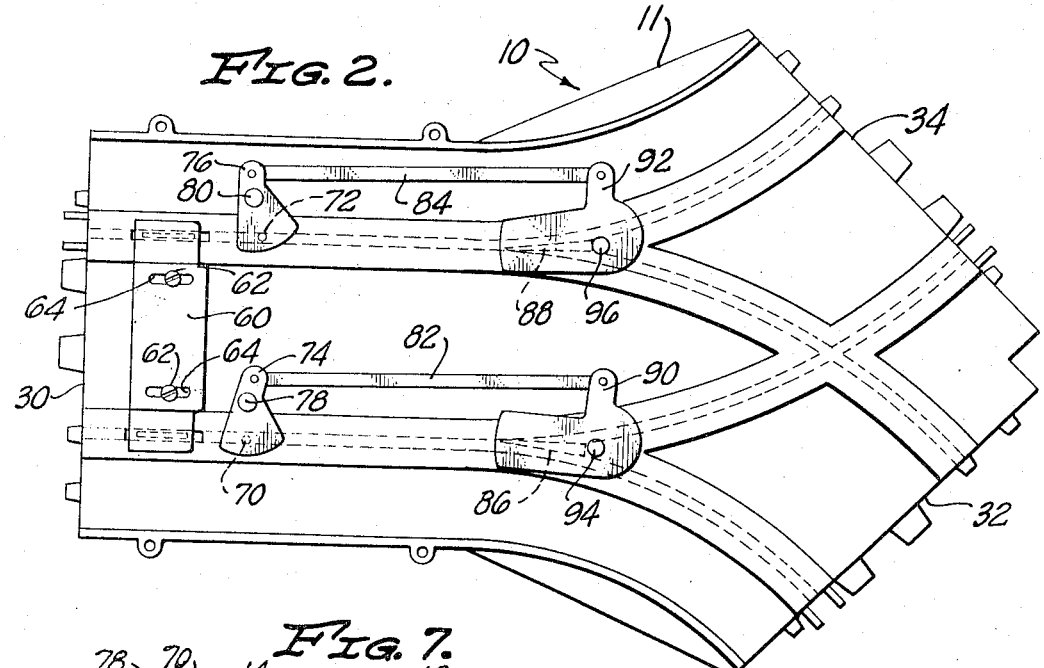
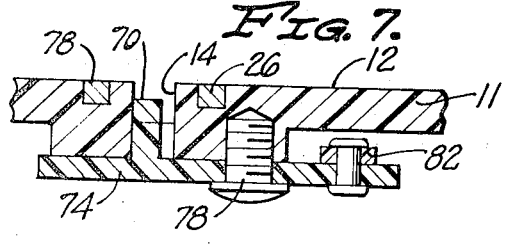
INVENTOR.
AL L. CRAMER
BY
EDWARD D. O'BRIAN
ATTORNEY

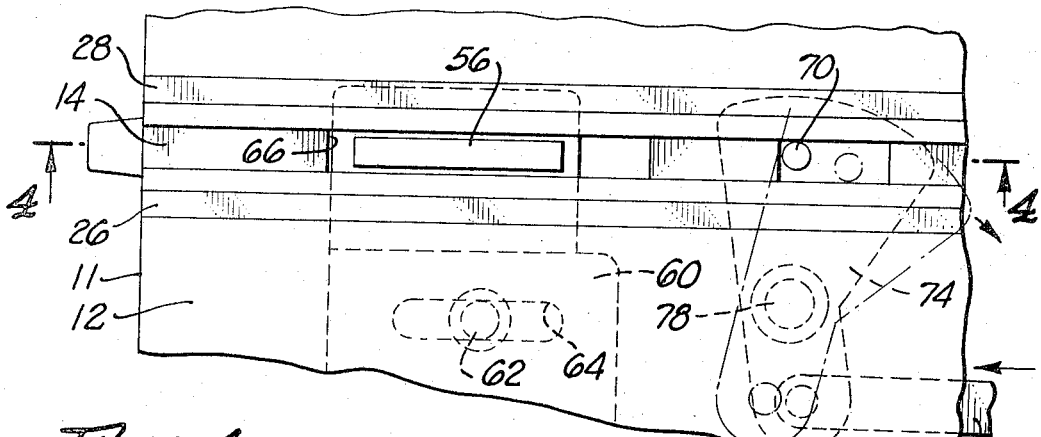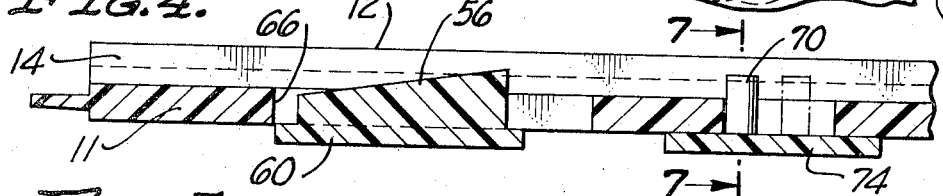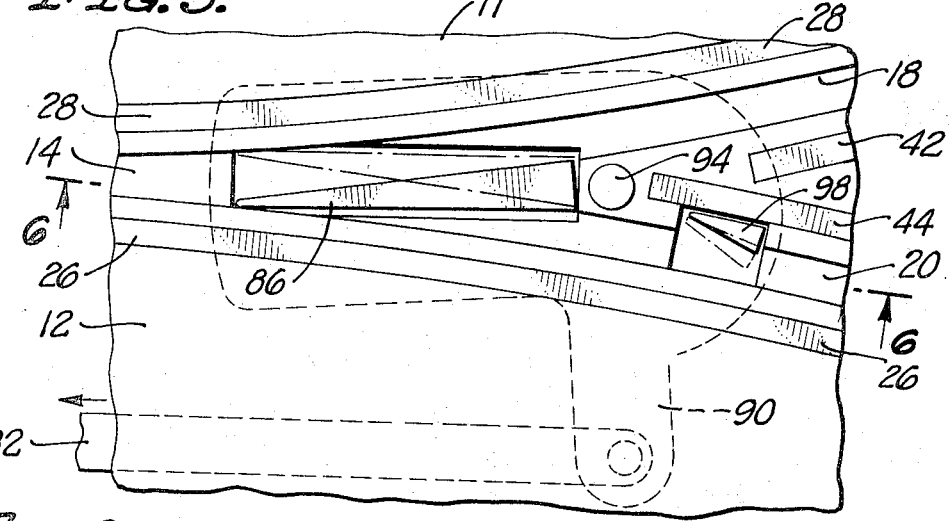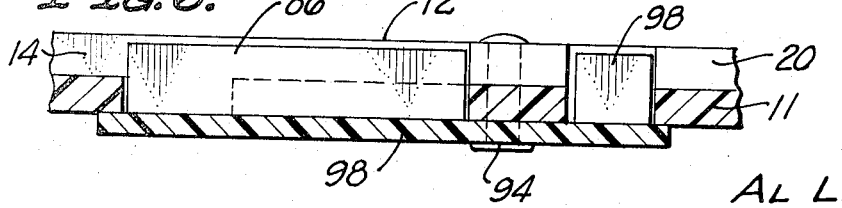

United States Patent Office 3,316,401
Patented Apr. 25, 1967

3,316,401
ROAD RACE TRACK SWITCH
Al L. Cramer, Garden Grove, Calif., assignor to Eldon Industries, Inc., Hawthorne, Calif., a corporation of California
Filed June 1, 1964, Ser. No. 371,647
5 Claims. (Cl. 246—415)

This invention is directed to a switch for controlling the direction of travel of a model road race car as it traverses its track.

Road race cars and track are well known in the art and comprise a road bed which is fitted with guide means, such as a guide groove or slot, and is fitted with means to power a road race car guided by the groove. The powering means is normally an electric contact rail positioned on each side of the groove. Road race cars adapted to be used with such tracks normally are in scale model form of known race cars or stock cars. Such model cars are normally fitted with supporting front wheels and powered rear wheels. A guide shoe mounted under the front of the model car engages in the guide groove and brushes adjacent the guide shoe electrically engage with the contact rails to permit energization of an electric motor mounted within the car which is connected to power the driving wheels. It is clear that with such an arrangement the car follows the guide groove, and appropriate manipulation speed may be required where curves are sharp. Most road race track sets are equipped with speed control for it is the manipulation of speed that permits the skill of the "driver" to be demonstrated and permits entertainment and participation by him.

It has been considered desirable to extend the versatility in building track layouts and configurations to have a switch which permits selective switching of the direction of travel of a road race car along alternative tracks. Accordingly, it is an object of this invention to provide a track switch for road race sets which permits selective travel along different paths. It is another object of this invention to provide a track switch for road race sets which is selectively actuatable for switching under the operator's control and to provide such selectivity through the speed of the road race car traveling along the track. It is another object of this invention to provide a switch which directs a slow moving car along one path and a fast moving car along another path so that path selection is made by varying the speed of the road race car as it approaches the switch.

Other objects and advantages of this invention will become apparent from a study of the following portion of this specification, the claims and the drawings in which:

FIG. 1 is a top plan view of the road race track switch of this invention;

FIG. 2 is a bottom plan view thereof;

FIG. 3 is an enlarged portion of the top plan view shown in FIG. 1;

FIG. 4 is a section taken along the line 4—4 of FIG. 3;

FIG. 5 is another enlarged portion of the top plan view of FIG. 1;

FIG. 6 is a section taken along the line 6—6 of FIG. 5; and

FIG. 7 is a section taken along the line 7—7 of FIG. 4.

As an aid to understanding this invention it can be stated in essentially summary form that it is directed to a switch track section for road race cars wherein the speed of the car determines whether the car goes in one direction or another. This switch track section is formed so as to be compatible with the other track sections and to receive, power and guide a model road race car. Accordingly, the track section has a guide groove extending below its generally flat top surface for the guidance of a car. Since this is a switch track section, a choice of routes is provided in the guide groove so that the car may be selectively directed in one direction or another. A switch blade is movably mounted at the points where the tracks diverge from each other in different directions, and the switch blade is of such configuration that it may lie against one side of the other of the groove to selectively direct the car along one of the first or second directions it can be directed by the switch. The switch blade normally lies in such a position as to direct the car along the first direction and means are provided to switch the switch blade to the other position so that the car will be directed along the second direction. This means includes a dog connected to the switch blade and extending part way up into the guide groove and an inclined ramp positioned within the groove immediately before the dog. Thus, as a car comes along the guide groove its shoe is raised by the ramp. If speed is sufficient, the shoe passes over the top of the dog and does not switch the blade and the car goes in the first direction. If the car is going slower, the shoe on the car engages the dog which switches the blade so that the car goes in the second direction. Means associated with the switch blade returns the switch blade to direct the succeeding car along the first direction if it does not engage the dog.

This invention will be understood in greater detail upon a study of the following portion of this specification wherein the drawings are described in detail. The road race car switch track section is generally indicated at 10 in FIGS. 1 and 2. The section 10 includes a base 11 which has a generally planar top surface 12 which is provided with entry guide grooves 14 and 16. Each of the entry guide grooves 14 and 16 is provided with first and second diverging guide grooves 18 and 20, and 22 and 24 respectively. Thus, entry guide groove 14 divides into first and second diverging guide grooves 18 and 20 so that a road race car entering on guide groove 14 can be directed in either of the first or second diverging directions. Similarly, the entry guide groove 16 divides into first and second diverging guide grooves 22 and 24 so that a road race car entering and being guided by guide groove 16 can be selectively guided in either of the first or second directions represented thereby. The actual switching structure which selectively guides the car into one or the other of the first or second guide grooves is identical in each case.

The road race car to be run upon the road race car switch track section 10 is of conventional construction and generally includes a chassis, and a body secured to the chassis to provide a realistic scale appearance thereto. Toward the front of the chassis, the road race car is supported by front wheels, usually on an unsteerable front axle. Between the wheels a guide shoe depends downwardly and engages in the appropriate guide groove, such as entry guide groove 14 for the guidance of the road race car. On each side of the guide shoe, the road race car is provided with depending electrical contact brushes and these brushes are adapted for engagement with electric contact strips 26 and 28 positioned next to the guide groove 14. These contact strips are suitably powered and controlled so that the person operating the road race car can control the speed thereof. The electrical brushes on the road race car are directly connected to an electric motor therein which is mechanically connected to drive the rear axle of the road race car to thus propel the car along the track. Accordingly, the operator of the road race car is in a position to remotely control the speed thereof as it proceeds down the road race track guided by the guide groove therein. Such speed control contributes a great deal to the pleasure resulting from the operation of the road race car, for at excessive speeds the road race car will leave the guide groove, or have its rear end skid out of control at the curves in the track.

The road race car switch track section 10 in FIGS. 1 and 2 is part of a compatible set so that other pieces of track, either curved or straight or of other nature, may be attached at each of the ends 30, 32 and 34. Appropriate tongues are formed thereon, as is seen in these figures, and these tongues are of such nature as to interlock with appropriate tongues and grooves on adjacent track sections so that a continuous track equipped with any desired selection of curves and straight sections can be assembled. In such an assembly, electrical continuity is present in each of the sets of contact strips. Thus, contact strips 26 and 28 can be remotely controlled separately from the contact strips 36 and 38 adjacent the guide groove 16. By this means individual operators of cars in each of the two guide grooves can vary their speed independently of the other. Appropriate interconnecting electric wires connect contact strip 26 with contact strips 40 and 42 and other wires connect contact strip 28 with contact strips 44 and 46 so that a car proceeding down guide groove 14 to either guide groove 18 or 20 is substantially continuously in electrical engagement with a suitable contact strip of correct polarity. Similarly, contact strip 36 is in electrical connection through suitable bridging wires with contact strips 48 and 50 and contact strip 38 is in electrical connection with contact strips 52 and 54.

Referring now more particularly to FIGS. 1, 2, 3 and 4, ramps 56 and 58 are shown therein. Each of ramps 56 and 58 has the form of an upwardly inclined surface extending into the grooves 14 and 16, respectively, and are upwardly inclined in the direction of left to right in these figures, which is the direction in which a road race car traverses this track section. Ramps 56 and 58 are secured to ramp adjustment plate 60 which is secured to the bottom of track section 10 by means of screws 62 passing through elongated adjustment hole 64 in the ramp adjusting plate. The ramps 56 and 58 extend upwardly into the guide grooves 14 and 16 through ramp slots 66 and 68 which are of sufficient size to permit movement of the ramp adjusting plate 60 in the direction of the elongated adjusting hole 64, and thus along the longitudinal direction of the guide grooves.

Positioned within the guide grooves 14 and 16 in the direction of car travel are dogs 70 and 72. These dogs are respectively mounted on dog plates 74 and 76 which are pivoted at 78 and 80 to the bottom of the track section 10. Connecting links 82 and 84 are respectively pivoted to the dog plates 74 and 76.

At the point where guide groove 14 diverges into first and second diverging guide grooves 18 and 20 a switch blade 86 is positioned to direct the guide shoe of the road race car. Switch blade 88 is similarly positioned at the point where guide groove 16 diverges into guide grooves 22 and 24. Switch blade 86 is mounted on switch plate 90 and switch blade 88 is mounted on switch plate 92. These switch plates are respectively pivoted at 94 and 96 in such a position as to permit each of the switch blades to lie in one side or the other of its junction, as is seen in full and dotted lines in FIG. 5, to direct the road race car guide shoe into one or the other of the guide grooves. Connecting link 82 is connected to switch plate 90 and connecting link 84 is pivoted to switch plate 92 so that the positions of the dogs 70 and 72 respectively control the positions of switch blades 86 and 88. Return dogs 98 and 100 are respectively secured to switch plates 90 and 92 and are positioned in guide grooves 20 and 24. As is seen in FIG. 5, the return dog 98 moves about pivot point 94 with the switch blade 86. The return dog 98 is of such configuration as to be engaged by the guide shoe on road race car and thrust the switch blade 86 to its other position.

In operation, the road race car switch track section 10 is assembled into a complete track so that a continuous race course is defined for each of two cars and as is provided by the switch track section along two alternative paths. A car is placed upon each of the tracks so that it may proceed in the direction along the switch track section 10 from the left to right as is shown in these figures. Assuming that the car is being guided by groove 14, and it is desired that the car go to the left, guided by groove 18, the car is operated at a relatively high speed so that when its guide shoe is thrust upward by ramp 56 it stays high enough, long enough to clear the dog 70. Thus, the switch point 86 stays in its normal position, as is shown in the top of FIG. 1 and the full line position in FIG. 5, and the car proceeds to groove 18 as directed by the switch point 86. Should it be desired that the car proceed along groove 20, it is operated at a slower speed so that after its guide shoe rises up ramp 56, it descends before the dog 70. The guide shoe engages dog 70 which rotates dog plate 74 about its pivot 78 and through the agency of connecting link 82 moves switch plate 90 and switch point 86 to the dotted line position in FIG. 5. This position is also shown in the lower portion of FIG. 1. The switch blade 86 thus directs the guide shoe into guide groove 20 so that the car proceeds in that direction. As the guide shoe proceeds along guide groove 20, it engages with the return dog 98 which is then in the dotted line position of FIG. 5. This engagement causes the guide shoe to thrust the return dog 98 to the side and to return the entire movable structure back to the full line position shown in FIGS. 4 and 5. The switch track section is then ready for another operation. It can be seen that the two switch blades 86 and 88 can be independently operated so that the cars may be operated upon diverging paths, curved parallel paths or on crossing paths at the option of the two operators.

It is clear that this structure is susceptible to numerous modifications and embodiments without the exercise of the inventive faculty. The switch track structure can be applied to other forms of tracks suitable for road race car use and for other purposes where a toy vehicle is guided. Accordingly, the scope of this invention is defined by the scope of the following claims.

I claim:
1. A switch track section for use with model road race cars, said switch track section having a generally planar top surface adapted for the support of a road race car and having guide groove means depressed below said surface adapted for the guidance of a model road race car:
said guide groove means comprising an entry guide groove and first and second diverging guide grooves adapted to selectively guide a road race car in first or second directions, said entry guide groove and said diverging guide grooves meeting at a juncture;
a switch blade movably mounted at said juncture so as to be adapted to selectively guide a road race car from said entry groove to said first diverging groove, and from said entry groove to said second diverging groove;
a dog extending into said entry groove, said dog being adapted to be selectively actuated by a road race car traveling therepast, said dog being connected to said switch blade to move said switch blade; and
a ramp positioned within said entry groove adjacent said dog, said ramp being arranged to selectively act upon a road race car being guided by said entry groove so that it selectively engages said dog.
2. The switch track section of claim 1 wherein said ramp is adjustable with respect to said dog and with respect to said entry guide groove so that the selectivity of actuation of said dog by road race car is adjusted.
3. A switch track section adapted for use with model road race cars, said switch track section comprising:
a frame having a substantially planar top surface adapted for the support of a model road race car, guide groove means in said switch track section extending below said planar surface, said guide groove means comprising an entry guide groove and first and second diverging guide grooves, said entry guide groove and said diverging guide grooves joining at a juncture;

switch blade means movably positioned at said juncture and arranged to selectively guide a road race car from said entry guide groove to one of said diverging guide grooves;

switch blade actuating means positioned in said entry guide groove and connected to said switch blade to actuate said switch blade and selective means adjacent said switch blade actuating means, said selective means comprising an inclined ramp arranged to act upon a road race car so that the road race car selectively engages said switch blade actuating means to thus selectively actuate said switch blade.

4. The switch track section of claim 3 wherein said ramp is positioned within said guide groove adjacent said switch blade actuating means and said ramp is positioned within said entry guide groove farther away from said switch blade than said switch blade actuating means.

5. The switch track section of claim 4 wherein said switch blade actuating means is a dog positioned within said entry guide groove, said dog being pivotally mounted to said switch track frame and being connected to said movable switch blade.

References Cited by the Examiner

UNITED STATES PATENTS

| | | | |
|---|---|---|---|
| 1,156,183 | 10/1915 | Saint. | |
| 3,108,398 | 10/1963 | Einfalt | 104—60 X |
| 3,117,755 | 1/1964 | Kretzmer | 246—415 |
| 3,154,024 | 10/1964 | Einfalt | 104—60 |
| 3,206,122 | 9/1965 | Frisbie et al. | 104—60 X |

FOREIGN PATENTS 894,837  4/1962  Great Britain.

ARTHUR L. LA POINT, *Primary Examiner.*

S. B. GREEN, *Assistant Examiner.*